United States Patent [19]

Inou et al.

[11] Patent Number: 4,680,688
[45] Date of Patent: Jul. 14, 1987

[54] DC/DC CONVERTER

[75] Inventors: Kiyoharu Inou; Hideaki Matsumura; Hitoshi Saito, all of Tokyo, Japan

[73] Assignee: Yokogawa Hokushin Electric Corporation, Tokyo, Japan

[21] Appl. No.: 786,661

[22] Filed: Oct. 11, 1985

[30] Foreign Application Priority Data

Oct. 23, 1984 [JP] Japan .................................. 59-222698

[51] Int. Cl.$^4$ .......................................... H02M 3/335
[52] U.S. Cl. ........................................ 363/21; 363/62; 363/131
[58] Field of Search ...................... 363/20, 21, 62, 131, 363/142, 143

[56] References Cited

U.S. PATENT DOCUMENTS

| 4,130,862 | 12/1978 | Holt | 363/21 |
| 4,195,333 | 3/1980 | Hedel | 363/21 |
| 4,209,826 | 6/1980 | Priegnitz | 363/21 |
| 4,562,522 | 12/1985 | Adams et al. | 363/21 |

Primary Examiner—Patrick R. Salce
Assistant Examiner—Anita M. Ault
Attorney, Agent, or Firm—Moonray Kojima

[57] ABSTRACT

A DC/DC converter for producing a plurality of output voltages, comprising a transformer having a primary coil and a plurality of secondary coils; a switching circuit adapted to turn ON and OFF the supply of input DC voltage to the primary coil; rectifying and smoothing circuits for rectifying and smoothing the AC voltages obtained in the secondary coils; a circuit means connected in series with the rectifying and smoothing circuits to obtain the sum of the output voltages from the respective rectifying and smoothing circuits; and a control circuit adapted to receive the lowest DC output voltage from the rectifying and smoothing circuits and to control the ON - OFF operation of the switching circuit so that the lowest voltage is maintained at a constant level, and wherein the DC voltages from the respective rectifying and smoothing circuits are obtained by making use of one of the output terminals of the lowest DC voltage as a common terminal.

7 Claims, 10 Drawing Figures

DC/DC CONVERTER

BACKGROUND OF THE INVENTION

1. Field of the Invention

This invention relates to a DC/DC converter which can produce a plurality of stable output voltages; and more particularly, to such a DC/DC converter wherein a DC voltage supplied to a primary coil is selectively turned ON and OFF to cause the output voltages to be at a constant level.

2. Description of the Prior Art

Power supplies are often required to produce a plurality of output voltages, such as 5 V, 12 V and 28 V. To reduce cost, such power supplies usually comprise multi-output converters.

FIG. 1 depicts a conventional stabilized power supply incorporating a multi-output ON/ON type converter. The converter comprises transformer T1 having a primary coil to which input DC voltage Vin is applied and secondary coils $n_2$, $n_3$. Diodes $D_1, D_2$ connected to coil $n_2$ rectifies AC voltage produced in secondary coil $n_2$. Diodes $D_3, D_4$ connected to coil $n_3$ rectifies AC voltage produced in secondary coil $n_3$. Filters, or smoothing circuits, comprising smoothing coils $L_1, L_2$ and smoothing capacitors $C_1$, $C_2$ are connected to the rectifiers as depicted. The outputs from these smoothing circuits comprise the power outputs $V_{o1}$ and $V_{o2}$.

A comparator $U_1$ having inputs from the upper output terminal and source of voltage $V_r$, as depicted, is adapted to compare $V_{o1}$ with reference voltage Vr. Comparator $U_1$ is connected to pulse width modulating (PWM) circuit 1 which is connected to the comparator $U_1$ as depicted, and is adapted to produce upon receipt of the output from comparator $U_1$, a pulse width signal corresponding to the difference between output $V_{o1}$ and reference voltage $V_r$. The PWM circuit 1 is connected to drive circuit 2 which is adapted to receive the ouput from PWM circuit 1. A switching transistor $Q_1$ is connected to drive circuit 2 at its base, and to input source and primary $n_1$, at its emitter and collector. Transistor $Q_1$ is turned ON and OFF by drive circuit 2 so as to turn ON and OFF input DC voltage Vin supplied to the primary coil $n_1$ of transformer $T_1$.

In this prior apparatus, one voltage output $V_{o1}$, of the two outputs $V_{o1}$ and $V_{o2}$, is compared with the reference voltage $V_r$ by comparator $U_1$, and transistor $Q_1$ is turned ON and OFF through action of PWM circuit 1 and driving circuit 2, so that the output voltage $V_{o1}$ takes a constant level, corresponding to the level of the reference voltage $V_r$, thereby to stabilize the output voltage $V_{o1}$ and substantially stabilize output voltage $V_{o2}$.

This prior apparatus, however, suffers from a disadvantage in that the output voltage $V_{o2}$ fluctuates over a wide range depending on the combination of loads connected to the two output terminals (labelled for convenience only as $V_{o1}$ and $V_{o2}$). Thus, it is known that prior devices leave much to be improved upon.

SUMMARY OF THE INVENTION

Accordingly, an object of the invention is to overcome the aforementioned and other disadvantages and deficiencies of the prior art.

Another object is to provide a multi-output DC/DC converter which is capable of stabilizing the main output voltage and, in addition, the other output voltages.

A further object is to provide a DC/DC converter wherein a pair of DC/DC converters are connected in series circuit at their primary sides and in parallel circuit at their secondary sides, thereby attaining high stability of operation and reliable over-current protection, while producing a large output and increased withstandable voltages.

A still further object is to provide a DC/DC converter which is provided with a noise filter for suppressing any extraneous noise emitted from the converter to the AC line.

The foregoing and other objects are attained by the invention which encompasses a DC/DC converter comprising a transformer having a primary coil and a plurality of secondary coils; a switching circuit adapted to turn ON and OFF the supply of input DC voltage to the primary coil; rectifying and smoothing circuits for rectifying and smoothing AC voltages obtained in the secondary coils; a circuit means which operates to obtain the sum of output voltages from the respective rectifying and smoothing circuits; and a control circuit adapted to receive the lowest DC output voltage from the rectifying and smoothing circuits and to control the ON-OFF operation of the switching circuit so that the lowest voltage is maintained at a constant level; and wherein the DC voltages from the respective rectifying and smoothing circuits are obtained by utilizing one of the output terminals of the lowest DC voltage as a common terminal.

In another embodiment, two or more converters are serially connected at their primaries and parallelly connected at their secondaries.

DETAILED DESCRIPTION OF THE PREFERRED EMBODIMENTS

Figure 1:
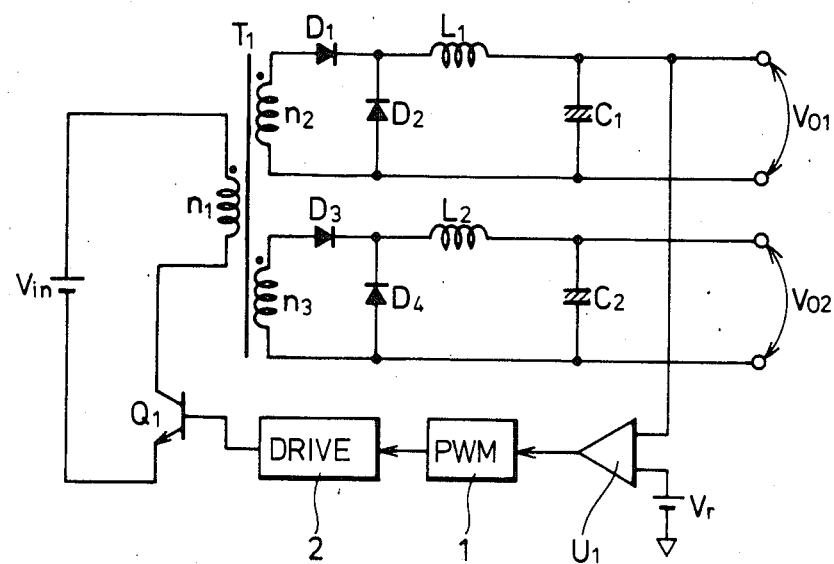
FIG. 1 is a circuit diagram depicting a conventional DC/DC converter.
Figure 2:
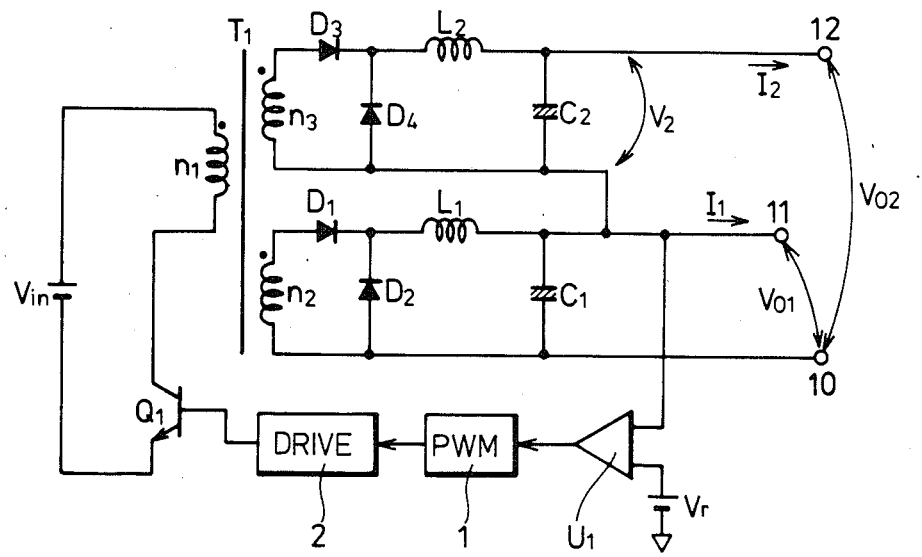
FIGS. 2-4 are circuit diagrams depicting illustrative embodiments of the invention.

In FIG. 2, the same reference numerals are used to denote the same elements as those used in FIG. 1. In the FIG. 2 embodiment, the AC voltage obtained in secondary coil $n_2$ is rectified by diodes $D_1, D_2$ and is smoothed by a smoothing coil or chokes $L_1$ and a capacitor $C_1$, thus obtaining an output voltage $V_{o1}$. On the other hand, the AC voltage produced in secondary coil $n_3$ is rectified by diodes $D_3, D_4$ and smoothed by a coil $L_2$ and capacitor $C_2$. The output terminals are connected, as depicted, so that the output voltage $V_2$ formed across smoothing capacitor $C_2$ is added to output voltage $V_{o1}$, and is available between terminals 10 and 12, which terminals constitute second output terminals, as an output voltage $V_{o2}$ which is greater than output voltage $V_{o1}$.

Comparator $U_1$ is adapted to receive the lowest DC output voltage $V_{o1}$ from among the outputs of the rectifying-smoothing circuits, and compares this voltage $V_{o1}$ with a reference voltage $V_r$, thereby producing an output signal which conducts an ON-OFF control of switching transistor $Q_1$ through action of PWM circuit 1 and drive circuit 2, thereby to maintain the output voltage $V_{o1}$ at a constant level corresponding to reference voltage $V_r$.

Output voltage $V_{o2}$ is also stabilized, because output voltage $V_{o1}$, available at the first output terminal, is stabilized.

It is assumed that output voltage $V_{o2}$ is changed by $\Delta V_{o2}$ as a result of a change in load current $I_2$ connected between second output terminals 10,12. The ratio $\Delta V_{o2}/V_{o2}$ is expressed by $$\frac{\Delta V_{o2}}{V_{o2}} = \frac{\Delta (V_{o1} + V_2)}{V_{o1} + V_2} \quad (1)$$

In formula (1), output voltage $V_{o1}$ is maintained constant with respect to reference voltage $V_r$, so that formula (1) can be transformed as follows:

$$\frac{\Delta V_{o2}}{V_{o2}} = \frac{\Delta V_2}{V_2} \quad (2)$$

$$= \frac{K}{1 + \frac{V_{o2}}{V_2}}$$

Therefore, if output voltage $V_{o1}$, available at the first output terminals, is 5 V, while output voltage $V_{o2}$, obtained at the second output terminals, is 12 V ($V_2 = 7$ V), the ratio of $\Delta V_{o2}/V_{o2}$ is expressed as $7/12 = 0.58$, so that the amount of fluctuation which is 10% in the conventional circuit, is reduced to 5.8% in the invention.

Figure 3:
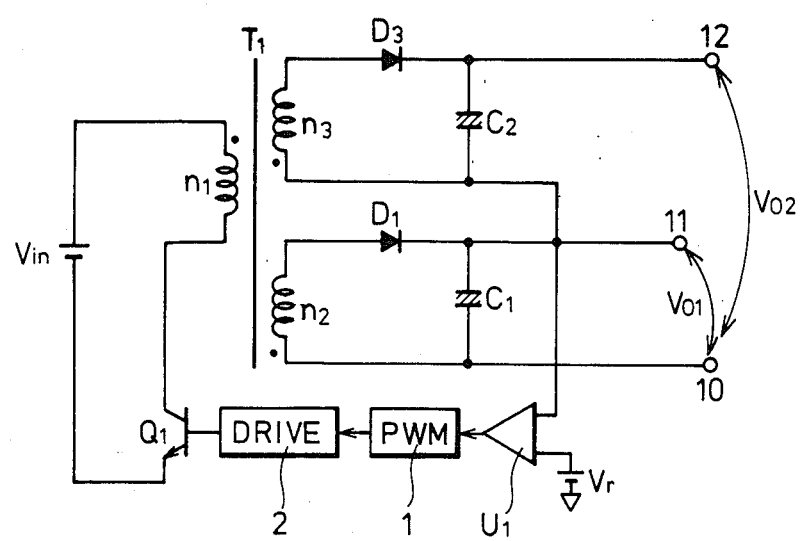

The FIG. 3 embodiment is an ON/OFF type converter and is different from the FIG. 2 embodiment in that secondary coils $n_2$ of transformer $T_1$ are wound in polarity which is reverse from that of primary coil $n_1$ of transformer $T_1$.

In the embodiment, two output voltages $V_{o1}$ and $V_{o2}$ are derived from the first and second output terminals, respectively. This, however, is not exclusive and a greater number of output is obtainable by increasing the number of secondary coils of transformer $T_1$.

Figure 4:
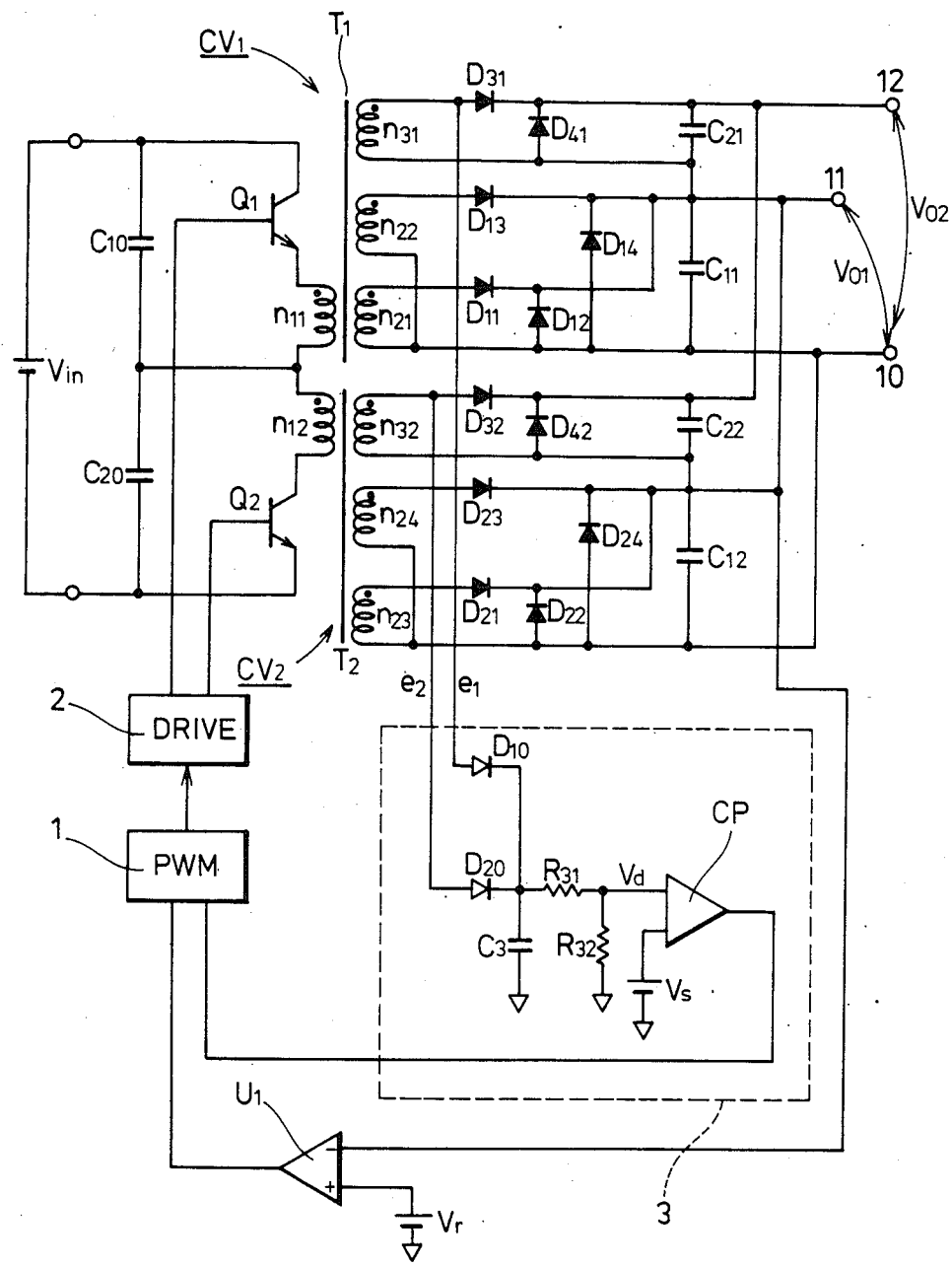

FIG. 4 depicts another illustrative embodiment wherein a pair of converters $CV_1$ and $CV_2$ are provided with primary coils $n_{11}$ and $n_{12}$ of transformers $T_1$ and $T_2$ being connected in series circuit. DC voltage Vin is potential divided by means of capacitors $C_{10}$ and $C_{20}$ and then the divided voltages are delivered to the primary coils through respective switching transformers $Q_1$ and $Q_2$. The secondary coils of the transformers $T_1, T_2$ are connected in parallel circuit.

Converters $CV_1$ and $CV_2$ comprise transformers $T_1$, $T_2$ having primary coils $n_{11}$, $n_{12}$ and secondary coils $n_{21}$, $n_{22}$, $n_{31}$, $n_{23}$, $n_{24}$, $n_{32}$; capacitors $C_{10}$, $C_{20}$ for potential dividing DC voltage Vin; transistors $Q_1$, $Q_2$ for delivering the potential divided voltages to primary coils $n_{11}$, $n_{12}$ after switching; rectifying diodes $D_{11}$, $D_{12}$, $D_{13}$, $D_{14}$, $D_{31}$, $D_{41}$, $D_{21}$, $D_{22}$, $D_{23}$, $D_{24}$, $D_{32}$, $D_{42}$ and smoothing capacitors $C_{11}$, $C_{21}$, $C_{12}$, and $C_{22}$.

The DC voltages obtained through rectification of the outputs from secondary coils $n_{21}$ and $n_{22}$ are delivered to capacitor $C_{11}$ in a parallel manner so as to be smoothed by the capacitor $C_{11}$, and output $V_{o1}$ is obtained at output terminals 10 and 11. The DC voltage obtained through rectification of the output from secondary coil $n_{31}$ is supplied to capacitor $C_{21}$ so as to be smoothed by capacitor $C_{21}$ and is added to voltage $V_{o1}$ available at capacitor $C_{21}$. Voltage $V_{o2}$, as the sum, is outputted from output terminals 10 and 12.

DC voltages obtained by rectifying outputs from secondary coils $n_{23}$ and $n_{24}$ are supplied to capacitor $C_{12}$ and is smoothed by capacitor $C_{12}$, so that a DC voltage $V_{o1}$ is outputted from output terminals 10 and 11. Therefore, DC voltages derived from capacitors $C_{11}$ and $C_{12}$ are connected in parallel. The DC voltage which is produced by rectifying the output of secondary coil $n_{32}$ is applied to capacitor $C_{22}$ and is smoothed by capacitor $C_{22}$. The smoothed DC voltage is added to voltage $V_{o1}$ derived from capacitor $C_{12}$. Voltage $V_{o2}$, as the sum, is outputted from output terminals 10,12. Thus, the DC voltages derived from capacitors $C_{12}$ and $C_{22}$ are connected in parallel with the DC voltages derived from capacitors $C_{11}$ and $C_{21}$.

A detecting circuit 3 is connected as depicted to receive signals $e_1$, $e_2$ from secondary coils $n_{31}$, $n_{32}$ of transformers T1 and T2, and thereby detect any extraordinary operation of the primary side of transformers T1 and T2. The output of detecting circuit 3 is connected to a control circuit 1 comprising a pulse width modulating circuit PWM. Detecting circuit 3 comprises rectifying diodes D10, D20 for rectifying voltages $e_1$, $e_2$ from secondary coils of transformers T1,T2; a smoothing capacitor C3 to which the rectified voltage is applied; resistors $R_{31}$ $R_{32}$ for potential dividing the voltage across capacitor C3; and a comparator connected to resistors $R_{31}, R_{32}$ and source VS, to compare the potential divided voltage Vd obtained through potential divider resistors $R_{31}, R_{32}$ and a set voltage VS.

The operation of FIG. 4 is as follows. In the normal state, voltage Vd, obtained by rectifying voltages $e_1$, $e_2$ of the secondary coils of transformers T1,T2, is below set voltage VS, so that comparator CP produces a signal of "L" level which indicates that the operation is normal. In this state, control circuit 1, comprising the PWM circuit, performs ON-OFF control of transistors Q1,Q2 so that output voltage $V_{o1}$ obtained through terminals 10,11 takes a constant level corresponding to reference voltage $V_r$.

In the event of any abnormality, such as breakdown of transistor Q1 in a short mode, voltage $e_1$ from the secondary coils of transformer T1 is lowered while voltage $e_2$ from the secondary coils of transformer T2 is increased. Consequently, the potential divided voltage Vd becomes equal to or higher than set voltage VS (i.e. $Vd \geq VS$), so that comparator CP produces an "H" level signal which represents the abnormality. PWM circuit 1 operates to turn transistors Q1,Q2 OFF, upon receipt of the "H" level signal from detecting circuit 3, thereby preventing failure of transistor Q1 from adversely influencing other circuit elements.

Figure 5:
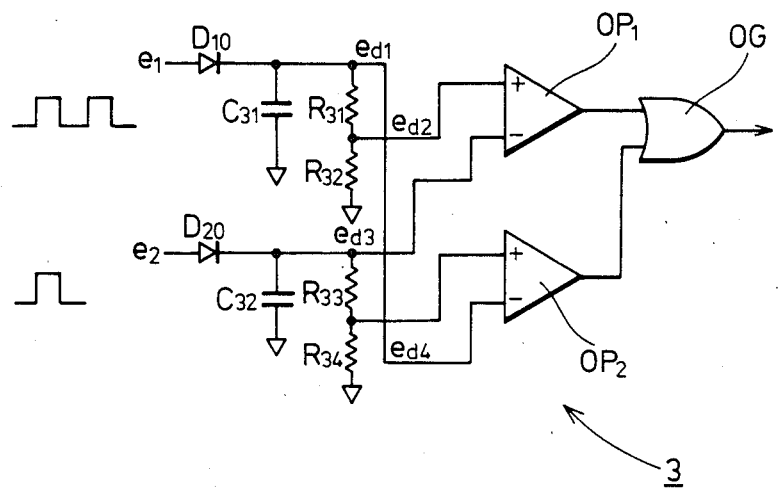
FIG. 5 is a circuit diagram depicting a detecting circuit which is used in the embodiment of FIG. 4.

FIG. 5 depicts a detecting circuit which may be used as the detecting circuit 3 of the embodiment of FIG. 4. This circuit 3 comprises diodes D10, D20 for rectifying voltages $e_1$, $e_2$ derived from respective secondary coils; smoothing capacitors $C_{31}$, $C_{32}$; potential dividing resistors $R_{31}$, $R_{32}$ and $R_{33}, R_{34}$ for potential dividing the voltages across the respective capacitors; amplifiers OP1 and OP2 connected as shown and adapted to conduct differential amplification of voltages $e_{d2}, e_{d3}$ and $e_{d4}, e_{d1}$ obtained across the respective potential amplifiers dividing resistors; and an OR gate OG which is connected as depicted and adapted to receive output signals from the respective amplifiers OP1,OP2. The detecting circuit 3 compares the coil voltages $e_1$ and $e_2$ (i.e. determines whether the conditions $e_1 \geq Ke_2$ and $e_2 \geq Ke_1$ (wherein $K \geq 1$) are met) to detect abnormality in the primary side.

Figure 6:
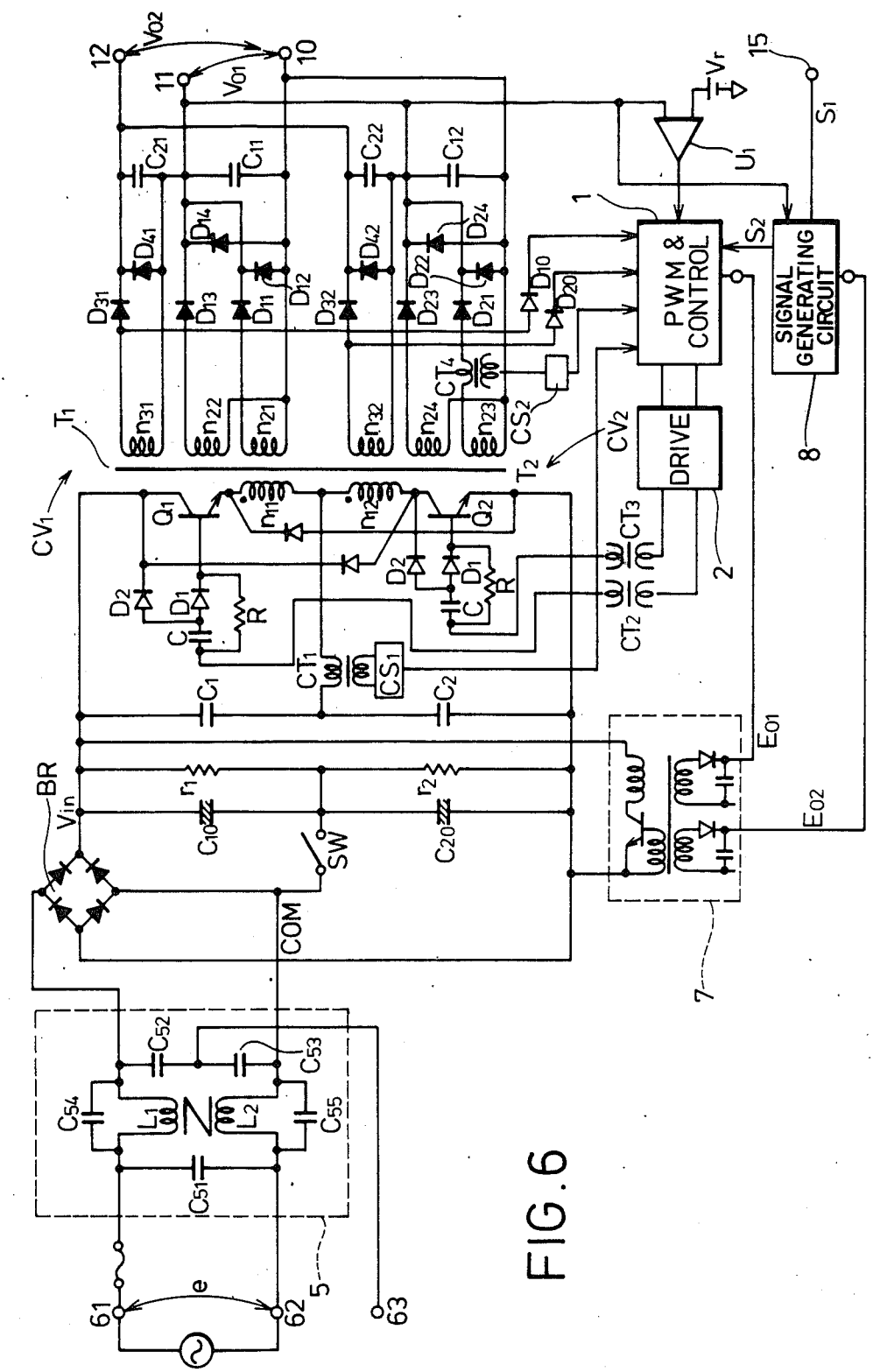
FIG. 6 is a block diagram depicting a DC/DC converter as used in a stabilized power supply device.

FIG. 6 depicts a stabilized power supply incorporating the invention DC/DC converter. Terminals 61,62 are connected to an AC power supply line and terminal 63 is connected to common or ground. The line supply is filtered by an AC line filter 5 which comprises capacitor $C_{51}$ connected between the AC lines, common mode chokes $L_1$, Lhd 2, grounding capacitors $C_{52}, C_{53}$ which are commonly connected to ground terminal 63. Capacitors $C_{54}$ and $C_{55}$ are connected in parallel with common mode chokes $L_1, L_2$ and have the same capacitance value, which value is selected so that the resonance frequency, in combination with the inductances of the common mode chokes $L_1, L_2$, falls within a predetermined range.

In general, the capacitance values of the capacitors $C_{54}, C_{55}$ are selected in relation to the capacitance values of capacitors $C_{52}, C_{53}$ so as to meet the following conditions:

$$C_{54}, C_{55} << C_{52}, C_{53}$$

Figure 7:
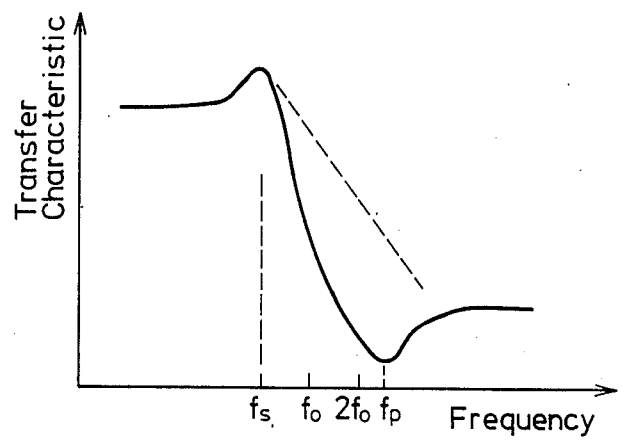
FIG. 7 is a diagram depicting the transfer characteristics of a filter incorporated in the embodiment of FIG. 6.

FIG. 7 shows the transfer characteristics of filter 5 of FIG. 6, from converter CV1, CV2 to the AC line. With this noise filter 5, a parallel resonance point $f_p$ is generated by common mode chokes $L_1, L_2$ and capacitors $C_{54}, C_{55}$. The series resonance point $f_s$ is generated by common mode chokes $L_1, L_2$ and capacitors $C_{52}, C_{53}$. The frequency characteristic exhibits a drastic change between series resonance point $f_s$ and parallel resonance point $f_p$, so that greater attenuation is obtained at around the switching frequency $f_o$ of the converters $CV_1, CV_2$ or around the frequency $2f_o$ which is double the switching frequency, as compared with the case where there is no parallel resonance point $f_p$. The noise elimination effect produced by capacitors $C_{54}, C_{55}$ ranges between 10 and 20 dB.

Returning to FIG. 6, a change over switch SW is connected between the neutral point of smoothing capacitors C10,C20 for smoothing the output of rectifying circuit BR and common line COM of the reference side of the AC source voltage. Switch SW is turned ON when, for example, the AC source voltage is 110 v, thereby effecting a double voltage rectification. On the other hand, when the AC voltage source is 220 V, switch SW is turned OFF to allow a bridge rectification. Thus, converter is adapted to both 110 V system and 220 V system.

The base circuits of transistors Q1,Q2 which serve as switching elements, comprise a steady base current supply circuit comprising resistors R, overdrive current paths comprising capacitor C and diodes $D_1$, $D_2$, thereby to enable application of overdrive current through capacitor C at the time of turning ON of the transistors. More specifically, in the steady state, base current is supplied through resistor R to transistors Q1,Q2 while the by-pass comprising diodes $D_1$, $D_2$ is inoperative, so that transistor $Q_1$, $Q_2$ are sufficiently saturated. On the other hand, when the load is light, as the collector voltage becomes sufficiently low, as a result of saturation of the transistors Q1,Q2, the overdrive current shunts to diode $D_2$. Thus, during turning ON of the transistors, the amount of overdrive is self balanced depending on the load, so that any substantial change of storage time due to change in the load is avoided during the turning OFF of the transistors.

Figure 8:
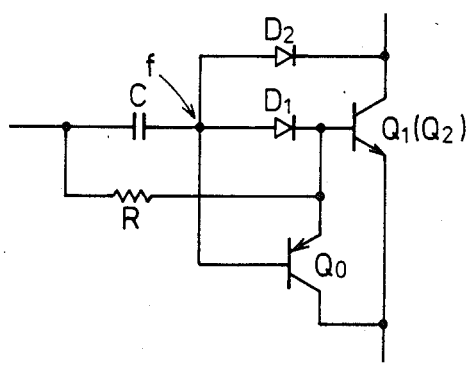
FIG. 8 is a circuit diagram depicting another driving circuit which may be used in the embodiments.

As shown in FIG. 8, it is possible to speed up the turning OFF of transistors Q1,Q2 which act as the switching elements, by connecting between the base and the emitter of the transistor, another transistor $Q_0$, having a base connected to the juncture f between capacitor C and diode $D_1$.

In the FIG. 6 embodiment, control circuit 1 is connected as depicted and adapted to receive a signal corresponding to the total current of the primary side through a current transformer CT1 and the overcurrent detection circuit $CS_1$, and also a signal corresponding to the load current in secondary coil $n_{23}$ through a current transformer CT4 and overcurrent detecting circuit $CS_2$. Switching elements $Q_1$, $Q_2$ are turned OFF, for example, in response to overcurrent detecting signal from either one of these overcurrent detecting circuit $CS_1, CS_2$. It is also possible to use a common overcurrent detecting circuit.

In FIG. 6, an auxiliary power DC/DC coverter 7 is connected as depicted and adapted to receive a DC voltage Vin from bridge rectification circuit BR. Output $E_{o1}$ is supplied from converter 7 as the power source to control circuit 1, while output $E_{o2}$ is supplied from converter 7 to a signal generating circuit 8.

Signal generating circuit 8 produces, upon receipt of signal $E_{o2}$ from converter 7, signals such as an information signal $S_1$ (produced at terminal 15) indicating supply or stop of the power and start/stop signal $S_2$ for controlling the start and stop of switching operation of the transistors. The start/stop signal $S_2$ is supplied to the control circuit 1.

Figure 9:
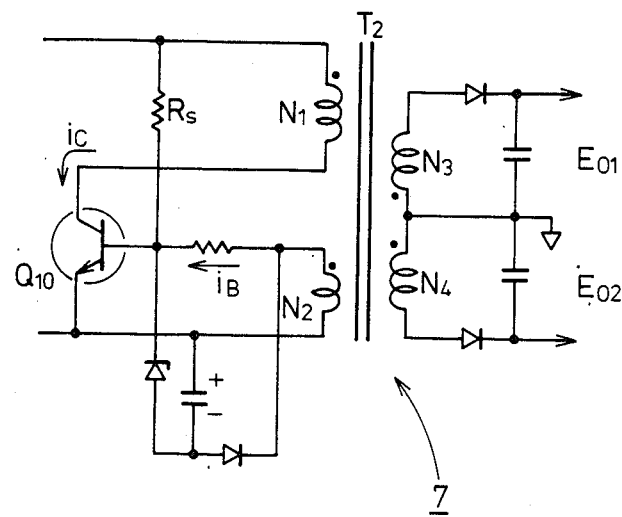
FIG. 9 and FIG. 10 are circuit diagrams depicting DC/DC converters for use as auxiliary power source in the embodiment of FIG. 6.
Figure 10:
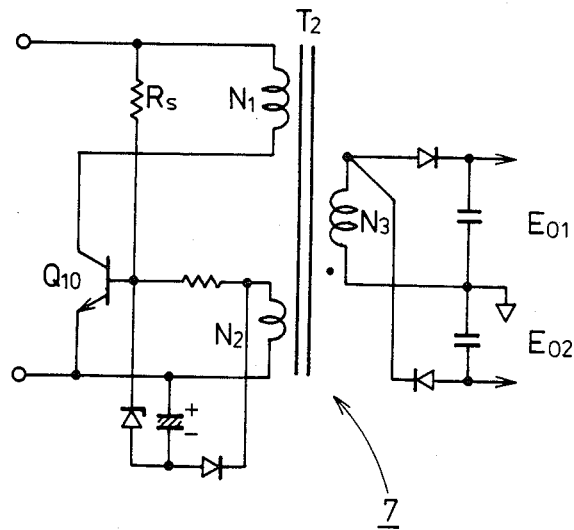

FIGS. 9 and 10 are examples of auxiliary DC/DC converters 7, incorporating therein a ringing choke converter. As transistor Q10 is activated by starting resistor RS, a positive feedback is made through a closed loop starting and ending with coil N1 past coil N2, base current iB, and collector current iC, thereby triggering an oscillation, and, consequently, generating an AC voltage in coil N3 or N4. The output AC voltage is rectified and smoothed to become DC voltages $E_{o1}$ and $E_{o2}$.

With this arrangement, it is possible to easily obtain, in addition to power for driving control circuit 1, a voltage signal $E_{o2}$ corresponding to the DC voltage Vin from the output side of the auxiliary power DC/DC converter 7. DC voltage signal $E_{o2}$ is electrically insulated from the primary side. It is thus possible to stably obtain an information signal which precisely indicates supply and stopping of the power with a high anti-noise characteristic.

Although the arrangement of FIG. 6 comprises specific circuits, additional or fewer specific circuits may be used.

The foregoing description is illustrative of the principles of the invention. Numerous modifications and extensions thereof would be apparent to the worker skilled in the art. All such modifications and extensions are to be considered to be within the spirit and scope of the invention.

What is claimed is:

1. A DC/DC converter comprising
at least one converter comprising a transformer having a primary coil and a plurality of secondary coils;

a switching circuit adapted to turn ON and OFF a supply of input DC voltage to said primary coil;

rectifying and smoothing circuits for rectifying and smoothing AC voltages obtained in said secondary coils;

a plurality of output terminals for outputting a plurality of DC output voltages from said rectifying and smoothing circuits;

circuit means for obtaining the sum of output voltages from resspective rectifying and smoothing circuits; and control means responsive to the lowest DC output voltage from said rectifying and smoothing circuits for controlling the ON-OFF operation of said switching circuit, thereby to maintain said lowest DC output voltage at a constant level; wherein one of said output terminals of the lowest DC output voltage is a common terminal;

wherein said input DC voltage is obtained by rectifying an AC voltage supplied through a noise filter, and wherein said noise filter comprises common mode chokes connected in parallel with respective power lines, and capacitors connected in parallel with respective common mode chokes and said capacitors having the same capacitance value, said capacitance value being selected so that the resonance frequency of said capacitances in combination with said common mode chokes, falls in a predetermined range.

2. The converter of claim 1, wherein said control means comprises a power supply comprising an auxiliary DC/DC converter, said auxiliary DC/DC converter receiving said input DC voltage, wherein an output of said auxiliary DC/DC converter is utilized at least as an information signal to indicate supplying or stopping of a power source.

3. A DC/DC converter comprising
at least one converter comprising
a transformer having a primary coil and a plurality of secondary coils;

a switching circuit adapted to turn ON and OFF a supply of input DC voltage to said primary coil;

rectifying and smoothing circuits for rectifying and smoothing AC voltages obtained in said secondary coils;

a plurality of output terminals for outputting a plurality of DC output voltages from said rectifying and smoothing circuits;

circuit means for obtaining the sum of output voltages from respective rectifying and smoothing circuits; and control means responsive to the lowest DC output voltage from said rectifying and smoothing circuits for controlling the ON-OFF operation of said switching circuit, thereby to maintain said lowest DC output voltage at a constant level; wherein one of said output terminals of the lowest DC output voltage is a common terminal;

wherein said switching circuit comprises a transistor having a base and a resistor connected to receive a driving signal for driving said transistor, a series circuit comprising a capacitor and a diode connected in parall with said resistor, and a diode connected between said capacitor and said diode and a collector of said transistor.

4. The converter of claim 3, wherein said control means comprises a power supply comprising an auxiliary DC/DC converter, said auxiliary DC/DC converter receiving said input DC voltage, wherein an output of said auxiliary DC/DC converter is utilized at least as an information signal to indicate supplying or stopping of a power supply.

5. A DC/DC converter comprising
at least one converter comprising
a transformer having a primary coil and a plurality of secondary coils;

a switching circuit adapted to turn ON and OFF a supply of input DC voltage to said primary coil;

rectifying and smoothing circuits for rectifying and smoothing AC voltages obtained in said secondary coils;

a plurality of output terminals for outputting a plurality of DC output voltages from said rectifying and smoothing circuits;

circuit means for obtaining the sum of output voltages from respective rectifying and smoothing circuits; and control means responsive to the lowest DC output voltage from said rectifying and smoothing circuits for controlling the ON-OFF operation of said switching circuit, thereby to maintain said lowest DC output voltage at a constant level; wherein one of said output terminals of the lowest DC output voltage is a common terminal; and wherein further comprising first and second converters having primary coils connected in series circuit, capacitors for potential dividing said input DC voltage and supplying the potential divided voltages to said primary coils through said switching circuit, and means for outputting the outputs of said secondary coils of said transformers in parallel.

6. The converter of claim 5, further comprising detecting circuits for detecting an abnormality in said primary sides of said transformers of said first and second converters, upon receipt of voltages in said secondary coils of said transformers, said control circuit controlling the ON - OFF operation of said switching circuit, upon receipt of said signal from said detecting circuit.

7. The converter of claim 5, wherein said control means comprises a power supply comprising an auxiliary DC/DC converter, said auxiliary DC/DC converter receiving said input DC voltage, wherein an output of said auxiliary DC/DC converter is utilized at least as an information signal to indicate supplying or stopping of a power supply.

* * * * *